Patented Apr. 24, 1945

2,374,337

UNITED STATES PATENT OFFICE 2,374,337

ARYLENE DIAMINE COMPOUNDS

Joseph B. Dickey and James G. McNally, Rochester, N. Y., assignors to Eastman Kodak Company, Rochester, N. Y., a corporation of New Jersey No Drawing. Application March 4, 1943,
Serial No. 478,003

6 Claims. (Cl. 260—558)

This invention relates to arylene diamine derivatives and to photographic developers comprising such compounds. This application is a continuation-in-part of our copending application, Serial No. 301,466, filed October 26, 1939.

It is known that o- and p-phenylene diamines and some of their N-substituted derivatives act as photographic developers. N, N-diethyl-p-phenylenediamine is used as a photographic developing agent in color photography.

We have now found new carbalkoxyalkyl, acylalkyl and carbamidoalkyl derivatives of o- and p-arylenediamines, and have further found that these derivatives are efficacious photographic developers, the carbamidoalkyl derivatives being especially useful owing to their low allergenic characteristics.

It is, accordingly, an object of our invention to provide new arylene diamine derivatives and a process for the preparation thereof. A further object is to provide new photographic developing agents comprising these new derivatives. Other objects will become apparent hereinafter.

Our new arylene diamine derivatives can be represented by the following general formula:

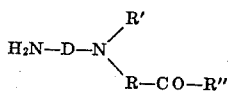

wherein D represents an o- or p-arylene group, e. g. an o- or p-phenylene group, R represents an alkylene group, e. g. methylene, ethylene, propylene, etc., R' represents hydrogen or an alcohol radical, e. g. methyl, ethyl, n-propyl, isopropyl, cyclohexyl, benzyl, β-hydroxyethyl, β-ethoxyethyl, β-acetylethyl, carbethoxy-methyl, furfuryl, etc. and R'' represents an alcohol radical such as set forth above under R', or an alkoxyl group or an amino group, e. g. a primary amino group (—NH₂), a secondary amino group (e. g. C₂H₅NH—) or a tertiary amino group, e. g.

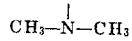

The compounds of lower molecular weight are the most efficacious photographic developers, e. g. those in which D represents an o- or p-phenylene group, in which R represents methylene or ethylene, in which R' represents hydrogen, methyl, ethyl or β-hydroxyethyl and in which R'' represents methyl, ethyl, methoxyl, ethoxyl, —NH₂, methylamino, ethylamino or dimethylamino. The p-phenylene compounds are generally superior to the o-phenylene compounds. Of this group of lower molecular weight compounds, the p-phenylene compounds in which R' represents an alcohol radical such as methyl, ethyl or β-hydroxyethyl are especially useful as photographic developers in color photography.

Our new compounds can be prepared by reducing appropriate azo compounds. The reductions are advantageously effected by hydrogenation, in the presence of a nickel catalyst, or by means of sodium hydrosulfite (sodium hyposulfite). Our new compounds can also be prepared by reducing the appropriate nitroso or nitro compounds. These reductions are advantageously effected by hydrogenation, in the presence of a nickel catalyst.

The following examples will serve to illustrate our new arylene diamine derivatives and the manner of preparing the same.

*Example 1—N⁴-ethyl-N⁴-(δ-keto-n-amyl)-2-methyl-p-phenylene-diamine*

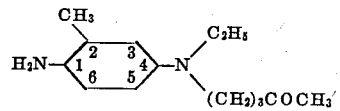

4 g. of sodium were dissolved in 50 cc. of absolute ethyl alcohol. The resulting solution was added with cooling to 20 cc. of ethyl acetoacetate. To the resulting mixture were added 30 g. of N-(β-chloroethyl)-N-ethyl-m-toluidine. The resulting mixture was stirred and heated on a steam bath under reflux for five hours. The sodium chloride which formed was removed by filtration. The excess ethyl alcohol and ethyl acetoacetate were removed in vacuo. The residue was dissolved in a mixture of 10 cc. of acetic acid, 200 cc. of water and 50 cc. of concentrated hydrochloric acid. Ammonia was added to the solution, whereupon N-ethyl-N-(δ-keto-n-amyl)-m-toluidine separated out. This m-toluidine derivative was extracted from the reaction mixture with diethyl ether, the ether extract dried over magnesium sulfate, the ether evaporated and the residual m-toluidine derivative distilled in vacuo. It boiled at 135° to 140° C. at 2 mm. of mercury pressure.

10 g. of N-ethyl-N-(δ-ketoamyl)-m-toluidine was coupled in acetic acid with the diazonium sulfate prepared from 10 g. of sulfanilic acid. The resulting azo dye was precipitated from the reaction mixture with aqueous sodium hydroxide. The azo dye was then reduced with sodium hydrosulfite. Aqueous sodium hydroxide was added to the reduction mixture and N-ethyl-N-(δ-n-amyl)-2-methyl-p-phenylenediamine separated. The p-phenylenediamine derivative was extracted from the reaction mixture with diethyl ether, the ether extract dried over magnesium sulfate and the ether evaporated. The remaining phenylenediamine derivative is a yellow oil which cannot be distilled without decomposition. The sulfate of the phenylenediamine derivative can be prepared by treating the derivative with an equimolecular proportion of 10 percent sulfuric acid.

*Example 2—N⁴-ethyl-N⁴-(γ-keto-n-butyl)-2-methyl-p-phenylenediamine*

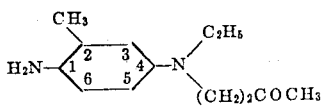

20.5 g. of N-ethyl-N-(γ-keto-n-butyl)-m-toluidine were dissolved in 200 cc. of water and ice containing 6 cc. of sulfuric acid. To the resulting mixture was added the diazonium sulfate prepared from 12.7 g. of o-chloroaniline. The azo dye which formed was precipitated by adding sodium acetate until all the mineral acid was neutralized. The azo dye was filtered off and washed with water. It was charged into a shaking autoclave containing 1 g. of Raney nickel catalyst and 200 cc. of methanol. The azo dye was then reduced at 20° to 25° C. under a hydrogen pressure of 1500 pounds. When two molecular equivalents of hydrogen had been absorbed, the mixture was removed from the autoclave, the catalyst filtered off and the methanol distilled off. The residue was then steam distilled to remove o-chloroaniline. The residue was then treated with a molecular equivalent of 10 percent sulfuric acid. The resulting sulfate of the phenylenediamine derivative was recrystallized from water, using activated charcoal to remove color. The resulting sulfate was greyish-white in color.

*Example 3—N⁴-(γ-keto-n-amyl)-N⁴-(n-propyl)-2-methoxy-p-phenylenediamine*

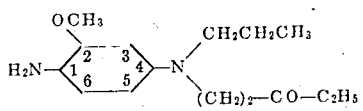

24.9 g. of N-(n-propyl)-N-(γ-keto-n-amyl)-m-amisidine were dissolved in 200 cc. of water and ice containing 15 cc. of hydrochloric acid. The diazonium sulfate from 17.3 g. of sulfanilic acid was added to the solution with stirring. Coupling was completed by adding sodium carbonate until the solution was acid to litmus. Sodium hydrosulfite was then added until no further color change took place. Sodium hydroxide was then added until the mixture was alkaline. The resulting mixture was extracted immediately with benzene. The benzene extract was treated with animal charcoal to remove color and then filtered. The benzene solution was then concentrated to dryness. The resulting phenylenediamine derivative was treated with an equimolecular proportion of 10 percent sulfuric acid to form the sulfate. The sulfate was recrystallized from water. It was a greyish-white solid.

*Example 4—N,N-di-(β-acetylethyl)-p-phenylenediamine*

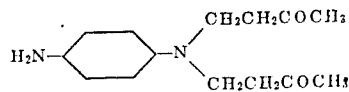

23.3 g. of di-(γ-keto-n-butyl)-aniline was coupled with the diazonium sulfate from 17.3 g. of sulfanilic acid as in Example 3. The resulting azo dye was reduced with sodium hydrosulfite and the phenylenediamine derivative isolated as in Example 3. The sulfate of phenylenediamine derivative was a greyish-white solid.

*Example 5—N-(β-hydroxyethyl)-N-(γ-keto-n-butyl)-p-phenylenediamine*

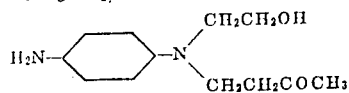

21.3 g. of N-(β-hydroxyethyl)-N-(γ-ketobutyl)-m-toluidine was coupled with the diazonium sulfate from 17.3 g. of sulfanilic acid as in Example 3. The resulting azo dye was reduced with sodium hydrosulfite and the phenylenediamine derivative isolated as in Example 1. The sulfate of the phenylenediamine was a greyish-white solid.

*Example 6—N-carbamidomethyl-N-methyl-p-phenylenediamine*

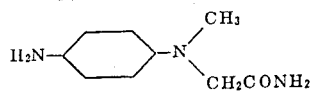

20.5 g. of N-methyl-N-phenyl glycineamide were suspended in about 100 cc. of 50 percent acetic acid. 32 g. of sulfanilic acid were diazotized in the usual manner using sulfuric acid, and the diazonium sulfate added to the above suspension. Coupling was completed by adding about 20 g. of sodium acetate. Then sodium hydrosulfite was added to the mixture until further addition caused no color change. The mixture was cooled and sodium hydroxide added until the mixture was alkaline. The alkaline mixture was stood in an ice bath for one hour. The crystals which separated were filtered off and washed with a little ice water. These crystals consisted of a mixture of phenylenediamine derivative and sodium chloride. The crystals were extracted with ethyl alcohol to remove the phenylenediamine derivative. The alcohol was removed from the alcoholic extract and the resulting phenylenediamine derivative was recrystallized from a methanol-water mixture containing 10 percent by volume of methanol. The phenylenediamine derivative melted at 137° to 139° C. The sulfate of the phenylenediamine derivative is a white solid.

*Example 7—N⁴-carbamidomethyl-N⁴-(β-methoxyethyl)-p-phenylenediamine*

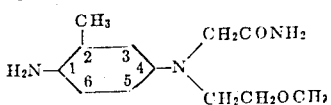

8 g. of N-(β-methoxyethyl)-N-(m-tolyl)-glycineamide were dissolved in 4 N hydrochloric acid. Into this solution was stirred a paste of diazotized sulfanilic acid. (The diazotized sulfanilic acid was prepared from 9 g. of sulfanilic acid, 6 cc. of sulfuric acid, 3.5 g. of sodium nitrite and 75 cc. of water, filtering off the diazonium salt and washing it sparingly with water.) To the resulting mixture was added sodium acetate until the color changed from red to orange. The azo dye formed was salted out of the reaction mixture and then dissolved in 100 cc. of water. Sodium hydrosulfite was added in small portions to the water solution to reduce the azo dye. The resulting solution was filtered and made basic with cold 40 percent aqueous sodium hydroxide. The resulting crystalline precipitate of phenylenediamine derivative was collected on a filter, washed with a little ice water and recrystallized from water. The resulting slightly pink crystals melted at 102° to 103° C. The white crystalline sulfate was prepared by treating the phenylenediamine derivative with an equimolecular proportion of 10 percent sulfuric acid.

*Example 8—N⁴-carbamidomethyl-N⁴-ethyl-2-methyl-p-phenylenediamine*

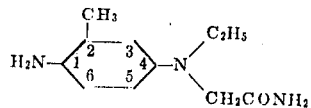

4 g. of N-ethyl-N-(m-tolyl)-glycineamide were dissolved in glacial acetic acid (20 cc.) and a paste of diazotized sulfanilic acid prepared as in Example 7 was added. An excess of aqueous sodium acetate was added and the mixture was allowed to stand until coupling was complete (30 minutes). The resulting azo dye was salted out, collected on a filter and washed with a little cold water. The moist dye was stirred into 50 cc. of water and sodium hydrosulfite was added until the solution became colorless. The solution was then neutralized with potassium carbonate and cooled in ice. The crystalline phenylenediamine derivative which separated was filtered off, washed with water and finally recrystallized from water. It melted at 125° to 126° C. Its sulfate can be prepared by treating the phenylenediamine derivative with a molecularly equivalent amount of 10 percent sulfuric acid.

*Example 9—N⁴-ethyl-N⁴-(β-carbdimethylamidoethyl)-2-methyl-p-phenylenediamine*

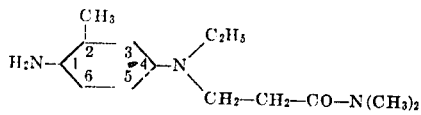

135 g. of N-ethyl-m-toluidine and 120 g. of ethyl acrylate were heated together in a shaking autoclave for six hours at 130° C. The reaction mixture was cooled and fractionally distilled to give a good yield of N-ethyl-N-(β-carbethoxyethyl)-m-toluidine. 112 g. of this m-toluidine derivative was charged into a shaking autoclave with 250 cc. of methanol and 40 g. of dimethylamine. The mixture was heated at 150° C. for six hours. When cool, the reaction mixture was concentrated to remove the alcohol. The resulting N-ethyl-N-(β-carbdimethylamide)-ethyl-m-toluidine was taken up in benzene and the benzene solution washed with sodium carbonate. The washed benzene solution was dried over magnesium sulfate and the benzene removed. 57 g. of this latter m-toluidine derivative were dissolved in 500 cc. of ice and water containing 50 cc. of hydrochloric acid. To this solution was added the diazonium sulfate prepared from 32 g. of o-chloroaniline. Coupling was completed by adding sodium acetate until the mixture was no longer acid to Congo red. The azo dye was filtered off, washed free from salts, and placed in a shaking autoclave in 500 cc. of methanol containing 5 g. of Raney nickel. The azo dye was reduced at 30° to 50° C. under a hydrogen pressure of 1500 pounds. When reduction was complete, the reaction mixture was steam distilled to remove o-chloroaniline. The residue from the steam distillation was treated with 490 cc. of 10 percent sulfuric acid. The resulting mixture was concentrated under reduced pressure until crystals of the sulfate of N-ethyl-N-(β-carbdimethylamide)-ethyl-2-methyl-p-phenylenediamine began to separate. The mixture containing the crystals was cooled in ice. The crystals were filtered off, washed with cold water and dried in the air. The crystals were white and did not have a definite melting point.

In a similar manner, N-(β-carbamidoethyl)-N-(β-hydroxyethyl)-2-methoxy-p-phenylenediamine and N-carb-β-hydroxyethylamide-N-methyl-2-chloro-p-phenylenediamine can be prepared.

*Example 10—N⁴-carbamidomethyl-N⁴-terahydrofurfuryl-2-methyl-p-phenylenediamine*

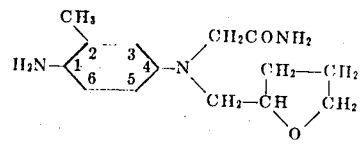

15.5 g. of N-tetrahydrofurfuryl-N-(m-tolyl) glycineamide were dissolved in acetic acid. The diazonium sulfate from 15 g. of sulfanilic acid were stirred into the above acetic acid solution. The resulting mixture was allowed to stand for 15 hours. An equal volume of water was added to the mixture. To the diluted mixture was added sodium hydrosulfite until the azo dye was completely reduced. The resulting solution was made alkaline with 40 per cent aqueous sodium hydroxide and then chilled. The oily precipitate of phenylenediamine derivative solidified. It was collected on a filter, washed with a little water, and recrystallized from water containing 10 percent (by volume) of methyl alcohol, decolorizing with activated charcoal. The phenylenediamine derivative, a pinkish, crystalline powder, melted at 128° to 129° C.

*Example 11—N⁴-ethyl-N⁴-carboxymethyl-2-methyl-p-phenylenediamine*

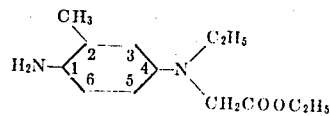

N-ethyl-N-(m-tolyl)-glycine ethyl ester (11.8 g.) were dissolved in 50 cc. of dilute hydrochloric acid (1 volume of acid to 4 of water). The solution was cooled in ice, and there was added slowly, with agitation, a solution of 4 g. of sodium nitrite in 30 cc. of water. After about 30 minutes, a p-nitroso derivative was precipitated by neutralizing the resulting mixture with sodium hydroxide. The p-nitroso derivative was filtered off, washed with water and dried in the air. The p-nitroso derivative was charged into an autoclave with 50 cc. of methanol and 0.5 g. of Raney nickel catalyst, at 40° to 60° C. under a hydrogen pressure of 1500 pounds. When hydrogenation was complete the contents of the autoclave were cooled and the catalyst filtered off. To the filtrate were added 1.3 g. of sulfuric acid and the sulfate of the phenylenediamine derivative separated out. It was filtered off, washed with acetone and dried in the air.

Example 12—N-(β-carbmethoxyethyl)-N-(β-hydroxyethyl)-1,4-diaminonaphthalene

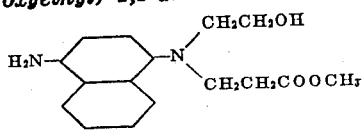

93 g. of N-(β-hydroxyethyl)-α-naphthylamine, 60 g. of methyl acrylate and 1 g. of acetic acid were heated at 160° C. in 250 cc. of 1,4-dioxane in a shaking autoclave for 12 hours. The reaction mixture was cooled, removed from the autoclave, and distilled under reduced pressure. The N-(β-carbmethoxyethyl)-N-(β-hydroxyethyl)-α-naphthylamine thus obtained (68 g.) was dissolved in 500 cc. of water and ice containing 30 cc. of hydrochloric acid. The diazonium sulfate from 32 g. of o-chloro-aniline was added to the solution and coupling was completed by neutralizing the mineral acid with sodium acetate. The resulting azo dye was filtered off, washed free from salts with water and then charged into an autoclave with 5 g. of Raney nickel catalyst and 500 cc. of methanol. The azo dye was hydrogenated at 60° C. under a hydrogen pressure of 1500 pounds. When reduction was complete, the autoclave was cooled and the contents steam distilled to remove o-chloroaniline and methyl alcohol. 24.5 g. of sulfuric acid were added to the residue and the resulting sulfate recrystallized from water. The sulfate is a pinkish-white substance of indefinite melting point.

Example 13—N-carbethoxymethyl-N-(β-hydroxyethyl)-o-phenylenediamine

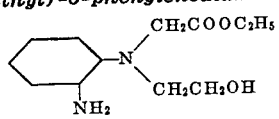

91 g. of N-(β-hydroxyethyl)-o-nitroaniline, 73 g. of ethyl chloroacetate and 50 g. of sodium bicarbonate were heated under reflux with a few crystals of sodium iodide. When carbon dioxide is no longer evolved, the reaction mixture was cooled, the salt filtered off and the filtrated treated with sodium bicarbonate and 30 g. of p-toluenesulfonyl chloride to react with unchanged N-(β-hydroxyethyl)-o-nitroaniline. When all the p-toluenesulfonyl chloride had dissolved, the mixture was extracted with 10 percent hydrochloric acid to remove the N-(carbethoxymethyl)-N-(β-hydroxyethyl)-o-nitroaniline. The resulting aqueous solution of the hydrochloride of the o-nitroaniline derivative was treated with sodium bicarbonate and extracted with ether to obtain the free o-nitroaniline derivative. The resulting ether solution was washed with water, and then charged into a shaking autoclave with 5 g. of Raney nickel catalyst. Hydrogenation was carried out at 50° C. under a hydrogen pressure of 1500 pounds. When reduction was complete, the autoclave was cooled, the catalyst filtered off, the ether removed, and the residue treated with 10 percent sulfuric acid to form the sulfate of the phenylenediamine derivative.

Example 14—N⁴-(carbmethoxymethyl)-N⁴-(n-propyl)-2-methoxy-p-phenylenediamine

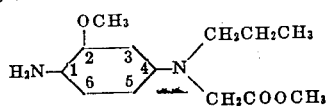

118 g. of N-(m-methoxyphenyl)-N-(n-propyl)-glycine methyl ester were dissolved in dilute hydrochloric acid. The solution was cooled in ice and the diazonium sulfate from 64 g. of o-chloroaniline was added to the solution. Coupling was completed by neutralizing the mineral acid with sodium acetate. The resulting azo dye was filtered off, washed free from salts with water and then charged into an autoclave with 5 g. of Raney nickel catalyst and 500 cc. of methanol. The azo dye was hydrogenated at 60° C. under a hydrogen pressure of 1500 pounds. When reduction was complete, the autoclave was cooled and the contents steam distilled to remove o-chloroaniline and methyl alcohol. Sulfuric acid was added to the residue and the resulting sulfate of the phenylenediamine derivative was recrystallized from water.

Our new arylene diamine derivative can be used to form photographic images by development of exposed silver halide contained in the usual gelatin carriers, or in carriers, such as collodion, cellulose esters or resins. Those of our new phenylenediamine derivatives which are especially adapted to use in color photography (see above) can be used to develop visible images from latent images in silver halide emulsions, or to develop silver images from silver halide images which are obtained by a so-called reversal process or by rehalogenizing a visible silver image. When employed in connection with color photography, the phenylenediamine derivatives act as developers in the presence of couplers, and the oxidation products of the phenylenediamine derivatives, arising from the developing action, couple with the couplers or color-formers to give colored bodies or dyes. When used for the formation of colored photographic images, the phenylenediamine derivatives can be used in conjunction with any well known coupler compounds, such as those described in Fischer U. S. Patent 1,102,028, dated June 30, 1914; Mannes and Godowsky U. S. Patent 2,108,602, dated February 15, 1938; Mannes, Godowsky, and Peterson U. S. Patent 2,115,934, dated April 26, 1938, and Mannes, Godowsky, and Peterson U. S. Patent 2,126,337, dated August 9, 1938.

All the arylenediamine derivatives described herein can be used for the purpose of producing black-and-white images from exposed photographic silver halide emulsions. Developing solutions comprising our new arylenediamine derivatives can be made up in the usual manner, using sodium sulfite and sodium carbonate.

The N-(β-chloroethyl)-N-ethyl-m-toluidine employed in Example 1 was prepared by condensing N-ethyl-m-toluidine with 1-chloro-2-bromoethane, according to the process described by v. Braun and Kirschbaum in Ber. 52, 1716 (1919) for the preparation of N-(β-chloroethyl)-N-methyl aniline.

The N-ethyl-N-(γ-keto-n-butyl)-m-toluidine employed in Example 2 was prepared as follows: 107 g. of m-toluidine, 77 g. of methyl vinyl ketone and 700 g. of water were warmed to 60° C. with stirring. The reaction mixture was stirred at 60° C. for 10 hours and then fractionally distilled to give a good yield of N-(γ-keto-n-butyl)-m-toluidine, boiling at 144° to 148° C. at 4 mm. of mercury pressure. 85 g. of this m-toluidine derivative were mixed with 50 g. of sodium bicarbonate and the mixture was heated on a steam bath under reflux with 90 g. of ethyl iodide for 5 hours. The cool reaction mixture was then extracted with 200 cc. of methanol. The methanol was removed from the methanol-extract and the residue distilled under reduced pressure to give a good yield of N-ethyl-N-(γ-keto-n-butyl)-m-toluidine.

The N-(n-propyl)-N-γ-keto-n-amyl)-m-anisidine employed in Example 3 was prepared by interacting m-anisidine with ethyl vinyl ketone (exactly as described above for m-toluidine and methyl vinyl ketone), and then interacting the so-prepared m-anisidine derivative with n-propropyl bromide (exactly as described above for ethyl iodide and the m-toluidine derivative).

The N,N-di-(γ-keto-n-butyl)-aniline employed in Example 4 was prepared as follows: 80 g. of N-(γ-keto-n-butyl)-aniline (prepared by interacting methyl vinyl ketone and aniline exactly as described above for methyl vinyl ketone and m-toluidine) were treated on a steam bath with 60 g. of β-chloroethyl methyl ketone and 60 g. of sodium bicarbonate. When carbon dioxide was no longer evolved, the cool reaction mixture was extracted with 200 cc. of methanol. The methanol was removed from the methanol-extract and the residue was distilled under reduced pressure to obtain the N,N-di-(γ-keto-n-butyl)-aniline.

The N-methyl-N-phenyl glycine amide employed in Example 6 was prepared by interacting N-methylaniline with chlor-acetamide, as described by Silberstein in Ber. 17, 2663 (1884).

N-(β-methoxyethyl)-N-(m-tolyl)-glycine amide employed in Example 7 was prepared by interacting N-(β-methoxyethyl)-m-toluidine with chloracetamide exactly as described by Silberstein for methylaniline and chloracetamide. N-(β-methoxyethyl)-m-toluidine was prepared as follows: 107 g. of m-toluidine, 5 g. of Raney nickel catalyst and 160 g. of β-methoxyethanol were heated, with shaking, in an autoclave, at 220° to 240° C. for 40 hours. The reaction product was removed from the cooled autoclave, the catalyst filtered off and the filtrate fractionally distilled to give a good yield of N-(β-methoxyethyl)-m-toluidine.

N-ethyl-N-(m-tolyl)-glycine amide employed in Example 8 was prepared by interacting N-ethyl-m-toluidine with chloracetamide exactly as described by Silberstein (supra) for methylaniline and chloracetamide.

N-tetrahydrofurfuryl-N-(m-tolyl)-glycineamide employed in Example 10 was prepared by interacting N-tetrahydrofurfuryl-m-toluidine and chloracetamide exactly as described by Silberstein (supra) for methylaniline and chloracetamide.

N-ethyl-N-(m-tolyl)-glycine ethyl ester employed in Example 11 was prepared by heating N-ethyl-m-toluidine with ethyl chloracetate exactly as described by Gault, Compt. rend. 145, 126 (1907) for methylaniline and ethyl chloracetate. N-ethyl-N-(m-tolyl)-glycine ethyl ester boils at 162° to 166° C. at 16 mm. of mercury pressure.

N-(m-methoxyphenyl)-N-(n-propyl)-glycine ethyl ester employed in Example 14 was prepared by heating N-(n-propyl)-m-anisidine with ethyl chloracetate exactly as described by Gault (supra) for methylaniline and ethyl chloracetate.

The term "alcohol radical," in accordance with customary usage, is intended to mean an organic radical which corresponds to an alcohol and is derived therefrom by dropping the hydroxyl group, e. g. n-propyl is derived from n-propyl alcohol by dropping the OH group, benzyl is derived from benzyl alcohol by dropping the OH group, and tertiary butyl is derived by dropping the OH group from tertiary butyl alcohol.

What we claim as our invention and desire to be secured by Letters Patent of the United States is:

1. An arylenediamine compound of the following general formula:

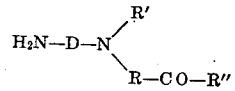

wherein D represents a p-phenylene group, R represents an alkylene group, R' represents an alcohol radical and R'' represents an amino group.

2. An arylenediamine compound of the following general formula:

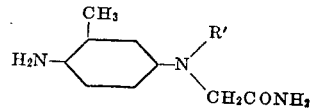

wherein R' represents an alcohol radical.

3. An arylenediamine compound of the following general formula:

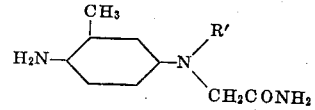

wherein R' represents an alcohol radical containing not more than two carbon atoms.

4. An arylenediamine compound of the following formula:

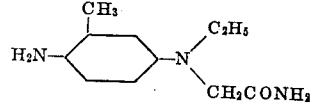

5. An arylenediamine compound of the following formula:

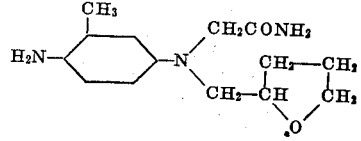

6. An arylenediamine compound of the following formula:

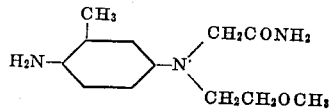

JOSEPH B. DICKEY.
JAMES G. McNALLY.